United States Patent
Gomez et al.

(10) Patent No.: US 8,545,351 B2
(45) Date of Patent: Oct. 1, 2013

(54) BELT TENSIONER WITH HIGH DAMPING RUBBER DEVICE

(76) Inventors: Marcelo Peregrina Gomez, Brusque (BR); Maicon Pessoa, Brusque (BR)

(*) Notice: Subject to any disclaimer, the term of this patent is extended or adjusted under 35 U.S.C. 154(b) by 196 days.

(21) Appl. No.: 13/031,647

(22) Filed: Feb. 22, 2011

(65) Prior Publication Data
US 2011/0287881 A1    Nov. 24, 2011

(30) Foreign Application Priority Data
May 18, 2010   (BR) ...................................... 1001531

(51) Int. Cl.
*F16H 7/10*    (2006.01)
*F16H 7/12*    (2006.01)

(52) U.S. Cl.
USPC ............................ 474/133; 112/135; 112/112

(58) Field of Classification Search
USPC .......................................... 474/133, 112, 135
See application file for complete search history.

(56) References Cited

U.S. PATENT DOCUMENTS

| | | | | |
|---|---|---|---|---|
| 481,536 A * | 8/1892 | Winton | ........................ | 280/286 |
| 3,545,737 A * | 12/1970 | Lamprey et al. | .............. | 267/141 |
| 3,817,113 A * | 6/1974 | Pfarrwaller | .................... | 474/134 |
| 3,975,965 A * | 8/1976 | Speer | ........................... | 474/135 |
| 4,144,772 A * | 3/1979 | Brackin et al. | ................ | 474/135 |
| 4,464,146 A * | 8/1984 | Arthur | ......................... | 474/133 |
| 4,696,663 A * | 9/1987 | Thomey et al. | ............... | 474/133 |
| 4,794,998 A * | 1/1989 | Iwai et al. | ...................... | 180/219 |
| 5,033,423 A * | 7/1991 | Diard | ........................ | 123/90.31 |
| 5,171,188 A * | 12/1992 | Lardrot et al. | ................ | 474/133 |
| 2009/0258741 A1* | 10/2009 | Nosaka et al. | ................ | 474/178 |

* cited by examiner

Primary Examiner — William A Rivera
Assistant Examiner — Henry Liu
(74) Attorney, Agent, or Firm — Furr Law Firm; Jeffrey M. Furr, Esq.

(57) ABSTRACT

"BELT TENSIONER WITH HIGH DAMPING RUBBER DEVICE", the present invention refers to the technical field of belt tensioners in general, more specifically a belt tensioner (1) with high damping and with a rubber device (2), designed to generate higher rigidity and high damping to belts in combustion engines. The object of the tensioner is to reduce manufacturing costs, wearing and noise, both of the tensioner itself and the belt.

6 Claims, 5 Drawing Sheets

BELT TENSIONER WITH HIGH DAMPING RUBBER DEVICE

PRESENTATION

The present invention refers to the technical field of belt tensioners in general, more specifically a belt tensioner with high damping by a rubber device, designed to generate higher rigidity and high damping to belt in combustion engines. The reason to develop this tensioner is to reduce manufacturing costs, wearing and noise, both of the tensioner itself and the belt.

BACKGROUND

Internal combustion engines need a torque transmission system by belt to activate alternators, water pump, air compressors and other accessories of the engine, as well as toothed belts to activate camshafts, injector pump and water pump.

Belt systems require adjustments during the operation of the engine to compensate slack and wear of the belt and other elements of the system, thus maintaining the tension of the belt under ideal levels to avoid loss of transmission, as well as the noise generated by the belt when sliding.

The compensation of belt slack or wear may be made by means of a manual or automatic tensioner. Automatic tensioners have technical advantages over the manual ones, but they are more complex and more costly.

Combustion engines are characterized by operating under an irregular rotation grade, which varies with the number of cylinders and driving wheel inertia. Such grade of irregularity is deleterious to various subsystems in the engine, such as the belt activation system. The working life of said automatic tensioners is limited due to this irregularity grade, as well as due to torque oscillations as required by accessories. The automatic tensioner works permanently.

Tensioners are applied to practically all vehicles having combustion engines, wherein the vast majority of models are automatic.

Conventional tensioners are composed by a base fixed to the engine block, hinged arm, spring and a dampening bush.

The automatic belt tensioner has the primary function to compensate the slack and wear of the belt and other elements of the system, by keeping the tension of the belt constant. The effect of the tensioner is the increased working life of the belt and the reduction of noise, besides allowing the extraction of better torque from the system.

Automobile industry sectors are increasingly requiring products having longer working life at lower prices from their suppliers. Therefore, there is an increasingly competition for new technology to stay competitive in the market.

State of the Art and Presented Defects

Automatic tensioners using springs to keep the tension under practically constant levels are already known in the market, as well as plastic dampening bushes, which generate friction with the hinged arm, reducing vibrations and oscillations of the system.

The dampening bush, since it works by the friction principle, has the inherent characteristic of wearing, limiting the working life of the product.

The spring generates torque at the hinged arm in the direction of the belt, but also generates a side effect which is crosswise torque, causing the tensioner to become misaligned. Said misalignment increases with bush wearing and, when combined with the effort of the spring, generates noise on the belt.

Another problem as presented is the difficulty or impossibility to do the maintenance of such models.

The new system dismisses the use of springs and dampening bushes as applied in the current state of the art and offers a much simpler and more efficient solution to enhance the operation, facilitate the manufacture and assembly and reduce costs and noise.

Another competitive advantage is the simple maintenance of all components composing the tensioner, wherein the body and the arm are fixed by a retention ring allowing disassembling and replacing the rubber element in case of wearing failure.

Besides the improvements as mentioned, the dampening element solves the wearing failure problem as found in the current state of the art, by eliminating the friction of the dampening bush and the crosswise torque of the spring. The damping element generates unidirectional torque, eliminating the misalignment of the tensioner, and also dissipating the energy by hysteresis of the rubber, generating only moderate heating, within admissible limits for the rubber compound as used.

DISCLOSURE OF THE INVENTION

The present invention presents a belt tensioner with high damping, bringing in as a novelty a rubber dampening device.

The device has been developed for application to new tensioners, so to substitute any kind of belt tensioners (model "V", polyV or toothed), as present in combustion engines.

The tensioner is composed by a hinged arm, wherein the edge with lower diameter is coupled and fixed by a bolt, the tensioner set, formed by a pulley with rolling and a dust-coat cap; and, on the other hand, a damping set is coupled, formed by a rubber damping device, a base, a sliding bush, a protection gasket and a retention ring.

DESCRIPTION OF OPERATION

The present invention works based on the use of a rubber damping device on the belt tensioner reacting to its compression caused by the belt, applying stable tension and granting a high grade of damping to the belt-activated system.

The assembly of the belt in the activation system of engine accessories is made by moving the tensioner in a specific angle. After the belt is assembled, it is released and starts to generate a tension force as duly established to transmit torque and avoid noise due to sliding.

Along the working life of the system, the parts will wear and the belt tends to elongate, requiring tension control which is guaranteed by the tensioner. The tensioner presents a maximum limit for compensation of wear and elongation.

BRIEF DESCRIPTION OF THE DRAWINGS

Objects, advantages and further important characteristics of the invention at issue may be more easily understood when read jointly with the attached figures, wherein.

DETAILED DESCRIPTION OF THE FIGURES

Figure 1:
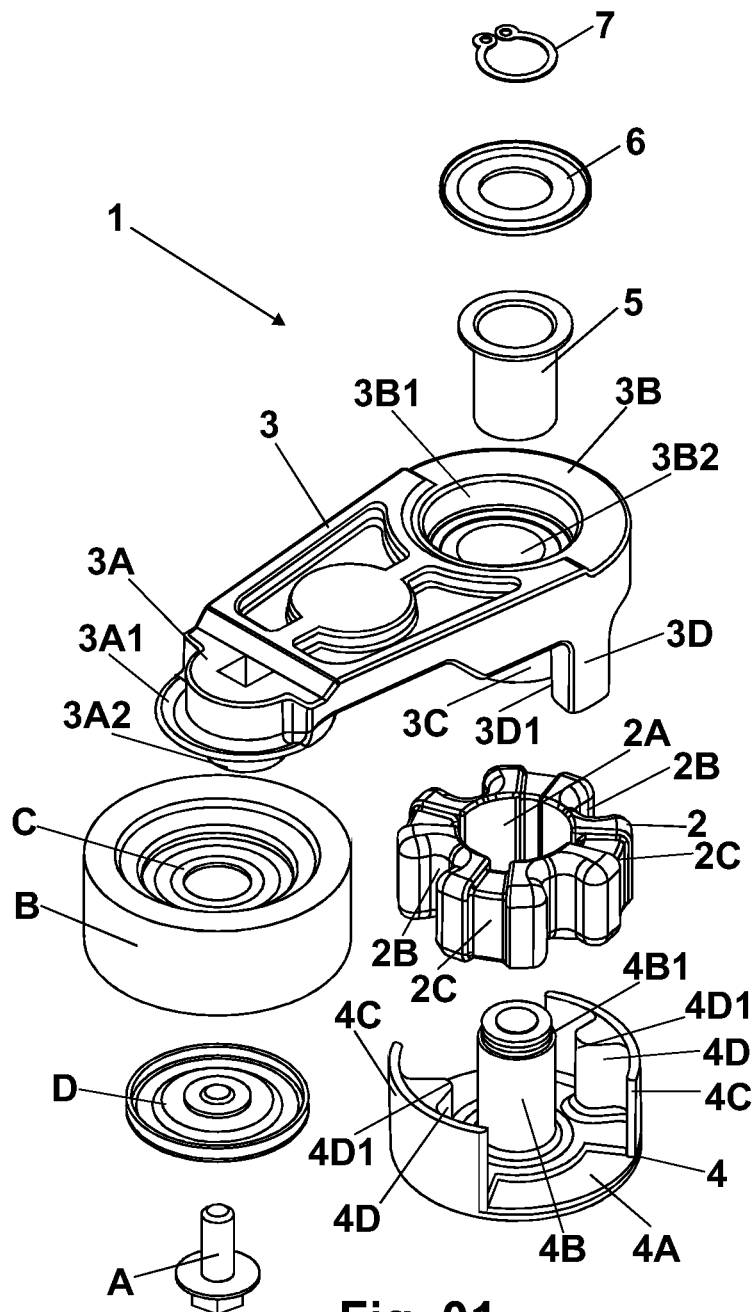
FIG. 1 shows an exploded view of the tensioner, in the embodiment with the main components of the invention.

As inferred from the attached figures showing and integrating the present invention of a "Belt Tensioner with High Damping Rubber Device", this is a dampening system developed for application to new models of belt tensioners (1) (model "V", polyV or toothed), present in combustion engines, comprising a rubber damping device (2), jointly with a new embodiment on the hinged or eccentric arm (3), a base (4); a sliding bush (5), a protection gasket (6) and a retention ring (7) for lodging, the damping work and device fixing.

The tensioner (1) is composed by a hinged arm (3), which end with smaller diameter (3A) is coupled and fixed by a bolt (A) to the stretching set, formed by a pulley (B) with rollers (C) and a dust-coat cap (D); and the other end with longer diameter (3B) is coupled to a damping set, formed by a rubber damping device (2), a base (4), a sliding bush (5), a protection gasket (6) and a retention ring (7).

The rubber damping device (2) has been developed for application to new belt tensioners (1), so to substitute any kind of tensioners, as present in combustion engines.

FIG. 1 shows an exploded view of all components of the new belt tensioner (1), wherein:

- the rubber damping device (2) is gear-shaped, containing one central cylindrical hole (2A) and four symmetrical sections with four deep "U" shaped cavities (2B) and four shallower cavities (2C);
- the hinged arm (3) has a specific disposition and, from the upside, it is oblong shaped with different diameters, wherein a ring (3A1) and a coupling pin (3A2) are located on the edge with smaller diameter (3A) for the tensioner set; and the edge with longer diameter (3B) includes a cylindrical upper opening (3B1), cylindrically thinner towards the center (3B2), forming the internal wall of the lower cylindrical pin (3C), wherein the damping set is coupled, and two prolongations or columns (3D) are located in parallel near the sides of the lower cylindrical pin (3C) with rounded internal corners (3D1) locking and damping the rubber device (2);
- the base (4) is formed by a circular platform (4A), wherein a central cylindrical pin (4B) is located in the center with upper gutters (4B1) and the side ridges of the platform have two wall sections (4C), each one with two columns (4D), with rounded internal corners (4D1), used as a guide and fitting for the rubber damping device (2);
- the sliding bush (5), the protection gasket (6) and the retention ring (7); and
- the stretching set, formed by the pulley (B), with rollers (C), the dust-coat cap (D) and the bolt (A).

According to the model, the rubber damping device (2) might present other arrangements or configurations.

According to the model, the hinged or eccentric arm (3) might have other arrangements or configurations to adapt itself to a wide range of belt tensioners, keeping other preponderant characteristics.

According to the model, the base (4) might present other arrangements or configurations to accommodate other kinds of rubber damping devices (2) and to adapt itself to a wide range of models of belt tensioners.

The tensioner set makes use of a pulley with rollers and a dust-coat cap, which are common elements of traditional tensioners.

Figure 2:
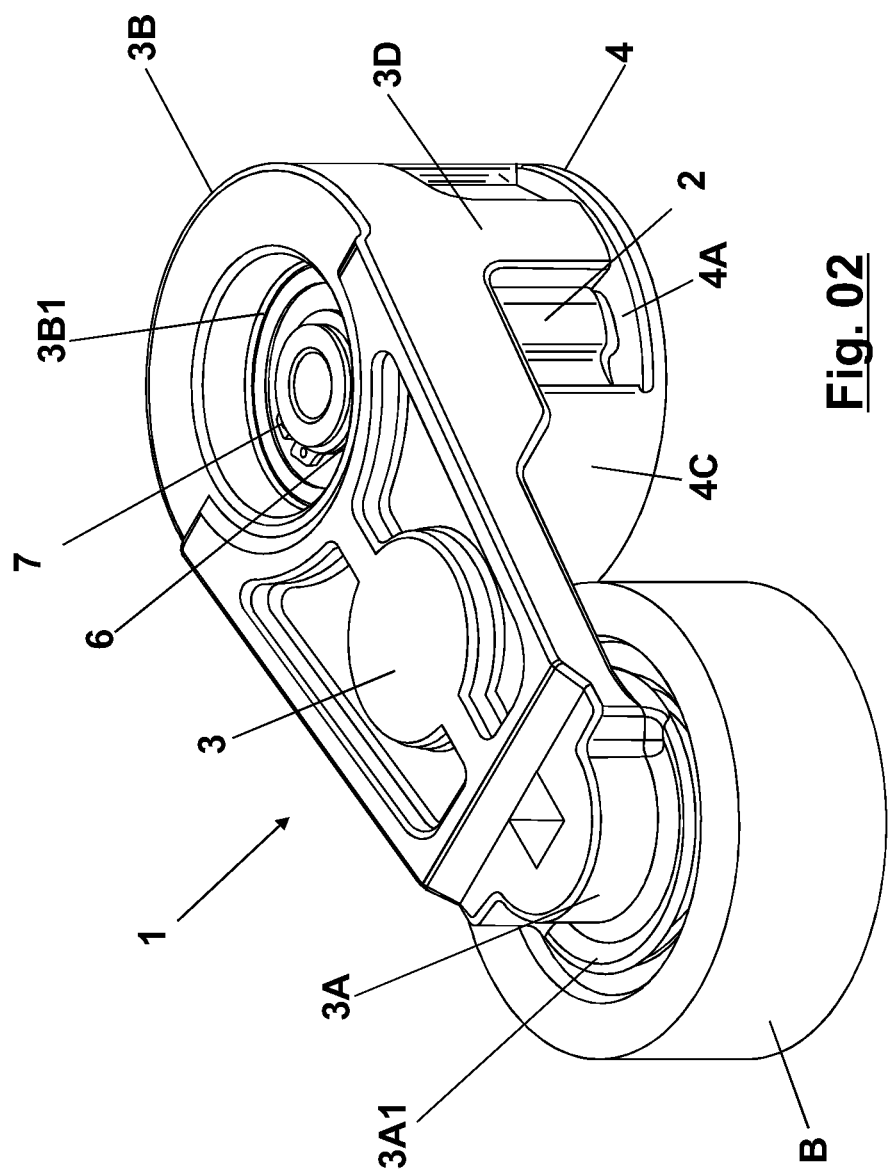
FIG. 2 shows a perspective view of the tensioner.

FIG. 2 shows a perspective view of the belt tensioner (1), showing the hinged arm (3) with the edge with smaller diameter (3A), the ring (3A1), the edge with longer diameter (3B), with the cylindrical upper opening (3B1) and the prolongations or columns (3D); the rubber dampening device (2); the base (4), with the circular platform (4A) and the two sections of walls (4C); the protection ring (6); the retention ring (7) and the pulley (B).

Figure 3:
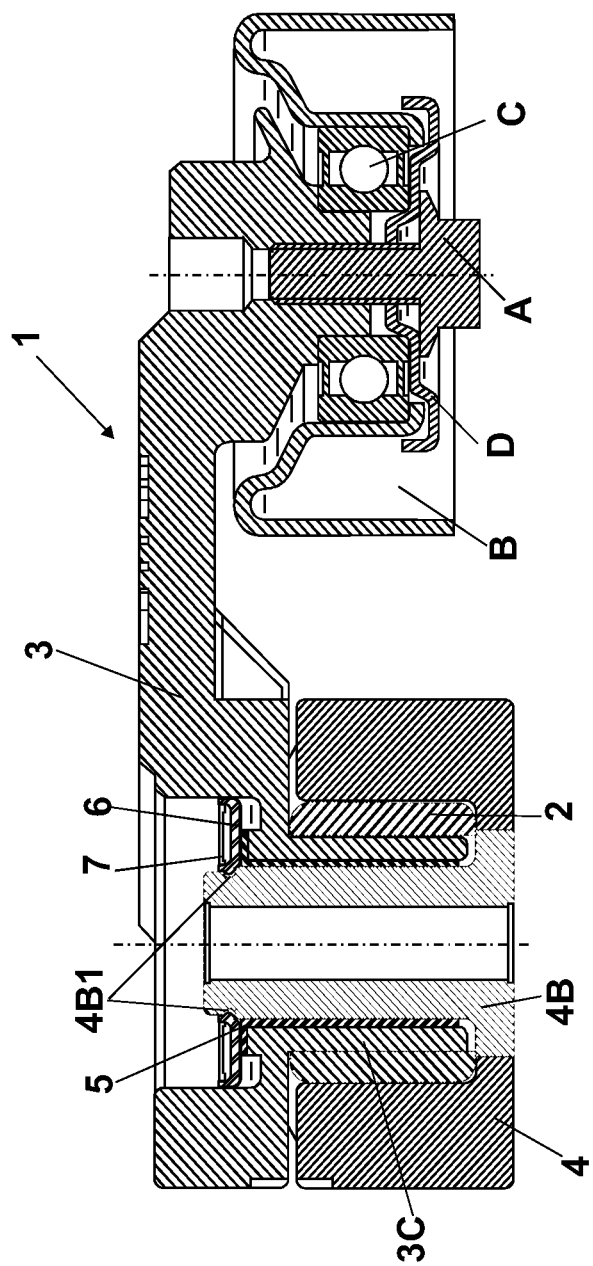
FIG. 3 shows a side cut view of the tensioner in the complete embodiment.

FIG. 3 shows a cut view of the belt tensioner (1), showing the rubber damping device (2), fitted into the lower cylindrical pin (3C) of the hinged arm (3) and coupled to the base (4), which is provided with a central cylindrical pin (4B), with upper gutters (4B1) wherein the protection gasket (6) and the retention ring (7) are fitted and fix the sliding bush (5) and the whole damping system. This view also shows the stretching set, formed by the pulley (B), with rollers (C), the dust-coat cap (D) and the bolt (A).

Figure 4:
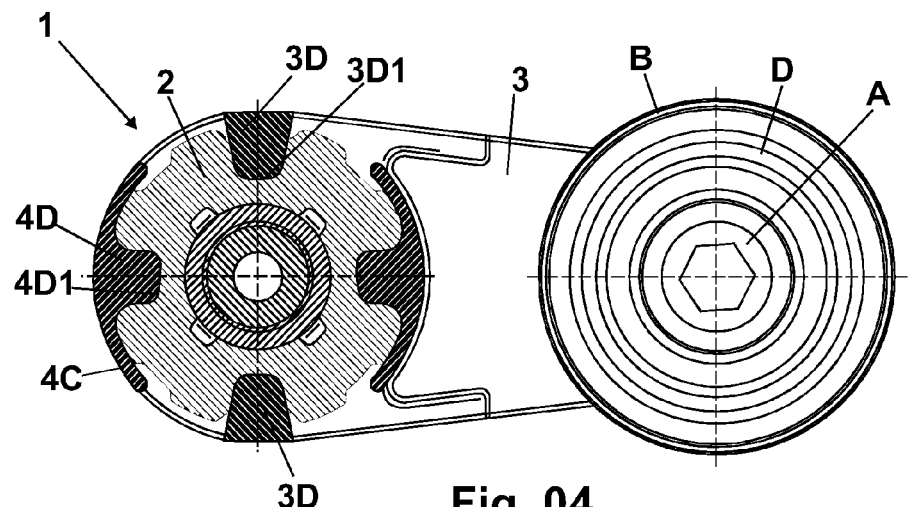
FIG. 4 shows an upper cut view of the tensioner in the unloaded embodiment.
Figure 5:
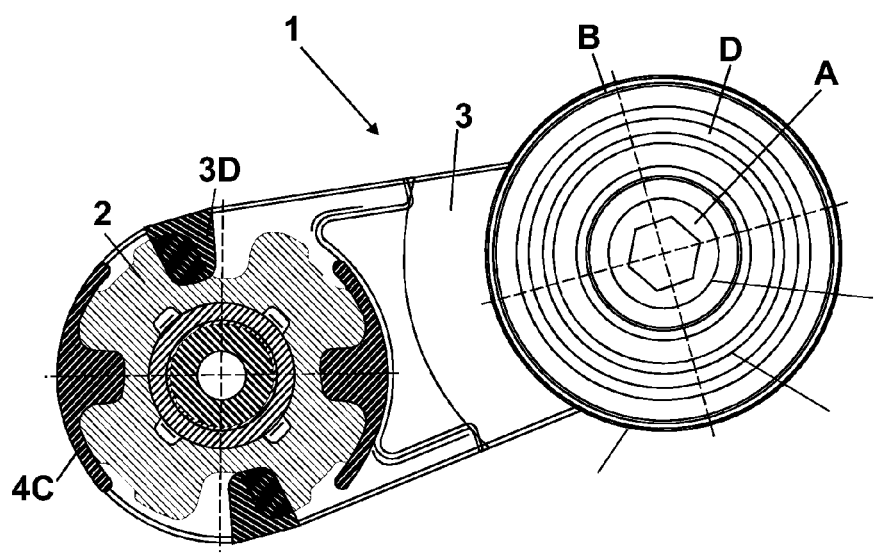
FIG. 5 shows an upper cut view of the tensioner, in the loaded embodiment, showing the work of the rubber dampening device.

FIGS. 4 and 5 show the cut views of the operation of the tensioner, wherein FIG. 4 shows an idle tensioner and FIG. 5 shows the torque transmission by the rubber element (2).

Figure 6:
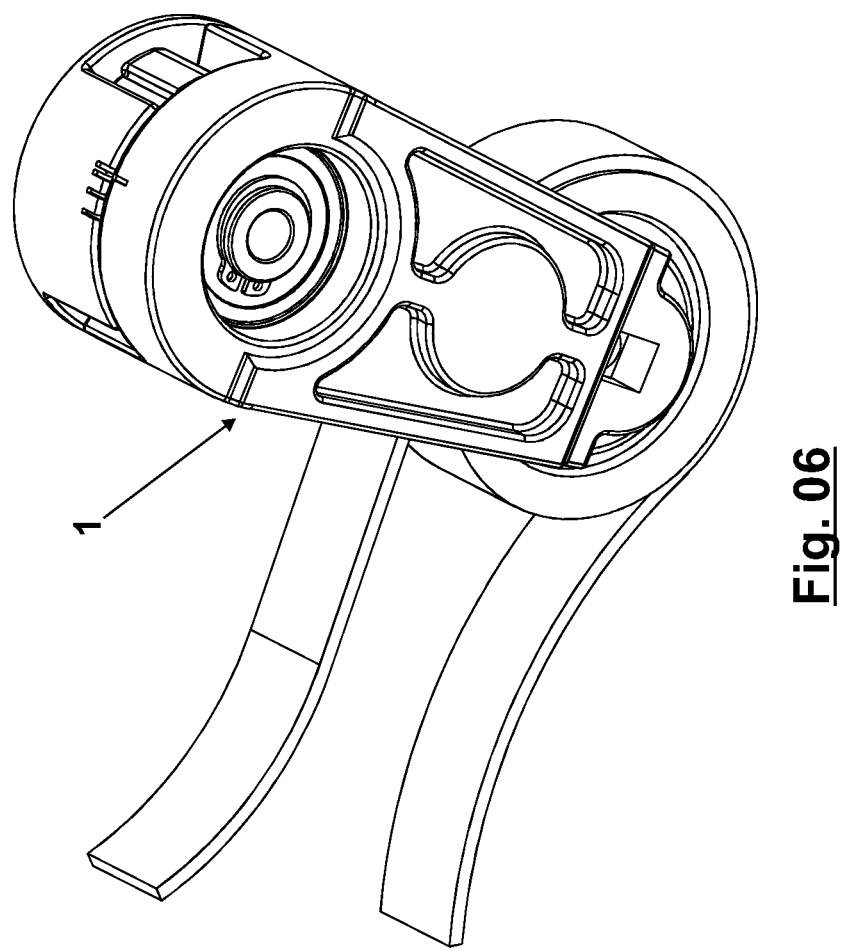
FIG. 6 shows a perspective view of the tensioner as applied to a belt.

FIG. 6 shows a perspective view of the belt tensioner (1), showing its application to a belt.

The parts of these sets may vary in sizes, shapes and materials to be adapted to any model of belt tensioner, but always keeping the same characteristics of the present invention.

The invention claimed is:

1. A bent tensioner with high damping device for a combustion engine, comprising: a hinged or eccentric arm (3) having a first end (3A) coupled to a stretching set and a second end (3B) coupled to a damping set, said damping set comprising a rubber device (2), a base (4), a sliding bush (5), a protection gasket (6), and a retention ring (7), characterized by the rubber damping device (2) being gear-shaped, containing one central cylindrical hole (2A) and four symmetrical sections with four deep "U" shaped cavities (2B) and four shallower cavities (2C);

wherein the hinged arm (3) is oblong shaped, the first end (3A) having a smaller diameter and comprising a ring (3A1) and a coupling pin (3A2) for coupling to the stretching set; and the second end (3B) having a larger diameter comprising a cylindrical upper opening (3B1), cylindrically thinner towards the center (3B2), forming the internal wall of a lower cylindrical pin (3C) to which the rubber damping device (2) is coupled, as well as two prolongations or columns (3D) located in parallel near the sides of the lower cylindrical pin (3C) with rounded internal corners (3D1) for locking and damping the rubber damping device (2);

wherein each of the deep "U" shaped cavities (2B) is between the symmetrical sections and each of the shallower cavities (2C) is in one of the symmetrical sections;

wherein the base (4) is formed by a circular platform (4A), said platform (4A) having a central cylindrical pin (4B) located in the center with upper gutters (4B1) and side ridges having two wall sections (4C), each one with two columns (4D), with rounded internal corners (4D1) acting as a guide for fitting the rubber damping device (2) wherein the tensioner set is formed by a pulley (B) with rollers (C), a dust-coat cap (D) and a bolt (A).

2. Belt tensioner with high damping device according to claim 1, wherein the base (4) is formed by a circular platform (4A), said platform (4A) having a central cylindrical pin (4B) located in the center with upper gutters (4B1) and side ridges having two wall sections (4C), each wall section with two columns (4D), with rounded internal corners (4D1) acting as a guide for fitting the rubber dampening device (2).

3. Belt tensioner with high damping device according to claim 1, wherein the base (4) is formed by a circular platform (4A), said platform (4A) having a central cylindrical pin (4B)

located in the center with upper gutters (4B1) and side ridges having two wall sections (4C), each one with two columns (4D), with rounded internal corners (4D1) acting as a guide for fitting the rubber dampening device (2).

4. Belt tensioner with high damping device according to claim 1, wherein the tensioner set is formed by a pulley (B) with rollers (C), a dust-coat cap (D) and a bolt (A).

5. Belt tensioner with high damping device according to claim 1, wherein the tensioner set is formed by a pulley (B) with rollers (C), a dust-coat cap (D) and a bolt (A).

6. Belt tensioner with high damping device according to claim 2, wherein the tensioner set is formed by a pulley (B) with rollers (C), a dust-coat cap (D) and a bolt (A).

\* \* \* \* \*